(12) United States Patent
Matsushita et al.

(10) Patent No.: US 8,018,612 B2
(45) Date of Patent: Sep. 13, 2011

(54) IMAGE PROCESSING APPARATUSES, METHODS AND SYSTEMS THAT SELECT AN APPARATUS FOR PERFORMING IMAGE PROCESSING ON AN IMAGE

(75) Inventors: Takafumi Matsushita, Kanagawa (JP); Jun Enomoto, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 1026 days.

(21) Appl. No.: 11/730,461

(22) Filed: Apr. 2, 2007

(65) Prior Publication Data

US 2007/0229912 A1 Oct. 4, 2007

(30) Foreign Application Priority Data

Mar. 31, 2006 (JP) .................................. 2006-099579

(51) Int. Cl.
*G06F 3/12* (2006.01)
(52) U.S. Cl. ...................................................... 358/1.15
(58) Field of Classification Search .................. 358/1.15
See application file for complete search history.

(56) References Cited

U.S. PATENT DOCUMENTS

| 6,809,831 | B1 * | 10/2004 | Minari ........................ 358/1.15 |
| 7,158,945 | B1 * | 1/2007 | Wolcott et al. .................. 705/26 |
| 7,456,877 | B2 | 11/2008 | Onuki |
| 7,616,230 | B2 | 11/2009 | Fukui |
| 2003/0011805 | A1 * | 1/2003 | Yacoub ........................ 358/1.15 |
| 2003/0093670 | A1 * | 5/2003 | Matsubayashi et al. ...... 713/168 |
| 2005/0146639 | A1 | 7/2005 | Onuki |
| 2005/0190383 | A1 * | 9/2005 | Levin et al. ..................... 358/1.1 |
| 2006/0002726 | A1 | 1/2006 | Fukui |

FOREIGN PATENT DOCUMENTS

| JP | 2000-76427 A | 3/2000 |
| JP | 2000-137788 A | 5/2000 |

(Continued)

OTHER PUBLICATIONS

Japanese Office Action issued in Japanese Application No. 2006-099579 dated Sep. 14, 2010 (3 pages).

*Primary Examiner* — Twyler Haskins
*Assistant Examiner* — Fred Guillermety
(74) *Attorney, Agent, or Firm* — Sughrue Mion, PLLC (57) ABSTRACT

An image processing apparatus includes: an image processing section that performs a predetermined image processing on the image; a first performance information acquiring section that acquires a first performance information including information regarding a time for which the image processing section performs the predetermined image processing on the image; a second performance information acquiring section that acquires a second performance information including information regarding a time for which any image processing apparatus other than the image processing apparatus performs the predetermined image processing on the image; a performance comparison section that compares the first performance information acquired by the first performance information acquiring section with the second performance information acquired by the second performance information acquiring section; a processing apparatus selecting section that selects which of the image processing section of the image processing apparatus or the other image processing apparatus performs the predetermined image processing on the image based on the comparison result by the performance comparison section; and a processing control section that causes either the image processing apparatus or the other image processing apparatus which is selected by the image processing apparatus selecting section to perform the predetermined image processing on the image.

9 Claims, 5 Drawing Sheets

FOREIGN PATENT DOCUMENTS

| | | |
|---|---|---|
| JP | 2000-148980 A | 5/2000 |
| JP | 2000-149018 A | 5/2000 |
| JP | 2002-112009 A | 4/2002 |
| JP | 2004-112052 A | 4/2004 |
| JP | 2004-145287 A | 5/2004 |
| JP | 2005-167332 A | 6/2005 |
| JP | 2006-50578 A | 2/2006 |

* cited by examiner

FIG. 5

IMAGE PROCESSING APPARATUSES, METHODS AND SYSTEMS THAT SELECT AN APPARATUS FOR PERFORMING IMAGE PROCESSING ON AN IMAGE

CROSS REFERENCE TO RELATED APPLICATION

The present application claims priority from a Japanese Patent Application(s) No.2006-099579 filed on Mar. 31, 2006, the contents of which are incorporated herein by reference.

BACKGROUND

1. Field of the Invention

The present invention relates to an image processing apparatus, an image processing method, an image processing program, an image processing system and an image processing control apparatus. Particularly, the present invention relates to an image processing apparatus, an image processing method, an image processing program, an image processing system and an image processing control apparatus that select an apparatus for performing an image processing on an image.

2. Related Art

When an electronic flash is used at capturing an image, a certain appearance could occur sometimes such that the pupils of a person are shown in red or gold. Such appearance is called red eye or gold eye, respectively. If the red eye or the gold eye is occurred, the captured subject is not shown well. Therefore, varies image processing methods for correcting the red eye or the gold eye to a natural color for the pupils have been proposed. For example, a method for performing a red eye correction processing has been disclosed as, for example, in Japanese Patent Application Publication No.2000-76427 (1). The method including the step of: causing a user to designate a target processing region including an eye image of which color is defect. Thereby the red eye correction processing is performed on the pupils based on the hue, the saturation and the lightness of the designated target processing region.

Additionally, a method for performing a red eye correction processing has been disclosed as, for example in Japanese Patent Application Publication No. 2004-145287 (4). The method includes the steps of: adding information to the captured image, such as an electric flash information, an Ev value, a shutter speed and a diaphragm value; and performing the red eye correction processing on only the image determined as that red eye is occurred. Moreover, a method for extracting a face region has been disclosed as, for example, in Japanese Patent Application Publication No. 2000-137788 (2). The method includes the steps of: extracting a candidate region including the face of a person from an image; dividing the extracted candidate region into a plurality of small regions; and collating the amount of characteristic of the plurality of small regions with a preset pattern of the face region. Further, a method for extracting a face region as, for example, in Japanese Patent Application Publication No. 2000-148980 (3). The method includes the steps of: extracting the face region of a person from an image; extracting a region being a candidate for the body of the person when the color density of the extracted face region is corresponding to a predetermined threshold value; and evaluating a probability that the extracted region is the face region by using the density and the saturation of the face or body region. Additionally, a method for extracting a face region has been disclosed as, for example, in Application Publication No. 2000-149018 (5). The method includes the steps of: extracting a plurality of face candidate regions from an image; and evaluating a probability based on the degree of overlapping the plurality of extracted face candidate regions.

In the inventions of the above described related art (1)-(5), however, when a predetermined image processing is performed on an image for each plurality of image processing apparatus, it is impossible to determine which of the plurality of image processing apparatuses preferentially performs an image processing on the image. Therefore, each of the plurality of image processing apparatuses could perform an image processing on the image regardless of the system resource condition of each image processing apparatus such as the load status of the image processing apparatus. Moreover, in the case that the plurality of image processing apparatuses are connected to each other through such as a network, when a first image processing apparatus performs an image processing on an image and transmits the same to a second image processing apparatus, the second image processing apparatus could perform an image processing which is preset in the second image processing apparatus on the image. In this case, the second image processing apparatus could perform the image processing the same as that performed by the first image processing apparatus on the image, so that an image processing different from that intended by the user could be performed on the image.

Thus, the advantage of the present invention is to provide an image processing apparatus, an image processing method, an image processing program, an image processing system, and an image processing control apparatus which are capable of solving the problem accompanying the conventional art. The above and other advantages can be achieved by combining the features recited in independent claims. Then, dependent claims define further effective specific example of the present invention.

SUMMARY

In order to solve the above, described problems, a first aspect of the present invention provides an image processing apparatus that performs an image processing on an image. The image processing apparatus includes: an image processing section that performs a predetermined image processing on the image; a first performance information acquiring section that acquires a first performance information including information regarding a time for which the image processing section performs the predetermined image processing on the image; a second performance information acquiring section that acquires a second performance information including information regarding a time for which any image processing apparatus other than the image processing apparatus performs the predetermined image processing on the image; a performance comparison section that compares the first performance information acquired by the first performance information acquiring section with the second performance information acquired by the second performance information acquiring section; a processing apparatus selecting section that selects which of the image processing section of the image processing apparatus or the other image processing apparatus performs the predetermined image processing on the image based on the comparison result by the performance comparison section; and a processing control section that causes either the image processing apparatus or the other image processing apparatus which is selected by the image processing apparatus selecting section to perform the predetermined image processing on the image.

The image processing apparatus further includes a processing time calculating section that calculates a first processing time for which the image processing section performs the predetermined image processing on the image based on the first performance information acquired by the first performance information acquiring section and calculates a second processing time for which the other image processing apparatus performs the predetermined image processing on the image based on the second performance information acquired by the second performance information acquiring section. The performance comparison section may compare the first processing time with the second processing time which are calculated by the processing time calculating section. The processing apparatus selecting section may select an image processing apparatus of which processing time is shorter among the image processing apparatus and the other image processing apparatus based on the comparison result by the performance comparison section. Then, the first performance acquiring section may acquire the first performance information for each of plural kinds of image processing. The second performance information acquiring section may acquire the second performance information for each of plural kinds of image processing. The processing time calculating section may calculate for each of the plural kinds of image, processing the first processing time for which the image processing section performs each of the plural kinds of image processing on the image based on each of the plural pieces of first performance information acquired by the first performance information acquiring section, and calculates for each of the plural kinds of image processing the second processing time for which the image processing section performs each of the plural kinds of image processing on the image based on each of the plural pieces of second performance information acquired by the second performance information acquiring section. The performance comparison section may compare for each of the plural kinds of image processing the first processing time with the second processing time which are calculated by the image processing time calculating section. The processing apparatus selecting section may select which of the image processing section of the image processing apparatus or the other image processing apparatus performs the plural kinds of image processing on the image based on the comparison result by the performance comparison section.

Moreover, the first performance information acquiring section may acquire the first performance information further including information indicative of the quality of an image processing. The second performance information acquiring section may acquire the second performance information further including information indicative of the quality of an image processing. The performance comparison section may compare the information indicative of the processing quality included in the first performance information acquired by the first performance information acquiring section with the information indicative of the processing quality included in the second performance information acquired by the second performance information acquiring section. The processing apparatus selecting section may select an image processing apparatus of which processing quality is higher among the image processing apparatus and the other image processing apparatus further based on the comparison result by the performance comparison section. When the image processing section of the image processing apparatus selected by the processing apparatus selecting section performs the predetermined image processing on the image, the processing control section records information indicating that the other image processing apparatus is prohibited from performing the predetermined image processing in association with the image.

Then, the image processing apparatus may further include an image processing instruction acquiring section that acquires an instruction to perform the predetermined image processing on the image according to an manual operation of a user. The image processing section may perform the predetermined image processing on the image based on the instruction acquired by the image processing instruction acquiring section. The processing control section may record information indicating that the other image processing apparatus is prohibited from performing the predetermined image processing when the image processing apparatus performs the image processing on the image according to the manual operation of the user.

Moreover, the image processing section may perform a red eye correction processing on the image. The first performance information acquiring section may acquire the first performance information including information regarding a time for which the image processing section performs the red eye correction processing on the image. The second performance information acquire section MAY acquire the second performance information including information regarding a time for which the image processing apparatus other than the image processing apparatus performs the red eye correction processing on the image. The processing apparatus selecting section may select which of the image processing section of the image processing apparatus or the other image processing apparatus performs the red eye correction processing on the image. The processing control section may cause either the image processing apparatus or the other image processing apparatus selected by the processing apparatus selecting section to perform the red eye correction processing, on the image. Further, the first performance information acquiring section may acquire first hardware resource information indicative of the hardware resource of the image processing apparatus as the first performance information. The second performance information acquiring section may acquire second hardware resource information indicative of the hardware resource of the image processing apparatus as the second performance information. The performance comparison section may compare the first hardware resource information with the second hardware resource information. The processing apparatus selecting section may select an image processing apparatus of which hardware resource is larger among the image processing apparatus and the other image processing apparatus based on the comparison result by the performance comparison section.

A second aspect of the present invention provides an image processing method for performing a predetermined image processing on an image. The image processing method includes the steps of; acquiring a first performance information on an image processing apparatus including information regarding a time for which the image processing apparatus performs the predetermined image processing on the image; acquiring a second performance information including information regarding a time for which any image processing apparatus other than the image processing apparatus performs the predetermined image processing on, the image; comparing the first performance information acquired in the first performance; information acquiring step with the second performance information acquired in the second performance information acquiring step; selecting which of the image processing apparatus or the other image processing apparatus performs the predetermined image processing on the image based on the comparison result in the performance comparing step; and controlling to cause either the image processing apparatus or the other image processing apparatus selected in the processing apparatus selecting step to perform the predetermined image processing on the image; causing either the image processing apparatus or the other image processing apparatus which is selected in the processing control step to perform the predetermined image processing on the image.

A third aspect of the present invention provides an image processing program for an image processing apparatus that performs an image processing on an image. The image processing program causes the image processing apparatus to function as: an image processing section that performs a predetermined image processing on the image; a first performance information acquiring section that acquires a first performance information including information regarding a time for which the image processing section performs the predetermined image processing on the image; a second performance information acquiring section that acquires a second performance information including information regarding a time for which any image processing apparatus other than the image processing apparatus performs the predetermined image processing on the image; a performance comparison section that compares the first performance information acquired by the first performance information acquiring section with the second performance information acquired by the second performance information acquiring section; a processing apparatus selecting section that selects which of the image processing section of the image processing apparatus or the other image processing apparatus performs the predetermined image processing on the image based on the comparison result by the performance comparison section; and a processing control section that causes either the image processing apparatus or the other image processing apparatus which is selected by the image processing apparatus selecting section to perform the predetermined image processing on the image.

A fourth aspect of the present invention provides an image processing system including a first image processing apparatus and a second image processing apparatus that perform image processing on images. The first image processing apparatus includes a first image processing section that performs a predetermined image processing on the image. The second image processing apparatus includes: a second image processing section that performs a predetermined image processing on an image; a second image processing section that performs the predetermined image processing on the image; a first performance information acquiring section that acquires first performance information including information regarding a time for which the first image processing section performs the predetermined image processing on the image from the first image processing apparatus, a second performance information acquiring section that acquires second performance information including information regarding a time for which the second image processing section performs the predetermined image processing on the image, a performance comparison section that compares the first performance information acquired by the first performance information acquiring section with the second performance information acquired by the second performance information acquiring section, a processing apparatus selecting section that selects which of the first image processing section of the first image processing apparatus or the second image processing section of the second image processing apparatus performs the predetermined image processing on the image based on the comparison result by the performance comparison section, a processing control section that causes either the first image processing section of the first image processing apparatus or the second image processing section of the second image processing apparatus which is selected by the processing apparatus selecting section to perform the predetermined image processing on the image.

A fifth aspect of the present invention provides an image processing control apparatus that controls a plurality of image processing apparatuses which perform image processing on images. The image processing control apparatus includes: a performance information acquiring section that acquires performance information including information regarding a time for which each of the plurality of image processing apparatuses performs a predetermined image processing on the image from each of the plurality of image processing apparatuses; a performance comparison section that compares performance information on the plurality of image processing apparatuses acquired by the performance information acquiring section with each other; a processing apparatus selecting section, that selects which of the plurality of image processing apparatuses performs the predetermined image processing on the image based on the comparison result by the performance comparison section; and a processing control section that causes the image processing apparatus selected by the processing apparatus selecting section to perform the predetermined image processing on the image.

A sixth aspect of the present invention provides an image processing system including a first image processing apparatus that performs an image processing on an image; a second image processing apparatus that performs an image processing on an image and a image processing control apparatus that controls the first image processing apparatus and the second image processing apparatus. The first image processing apparatus includes a first image processing section that performs a predetermined image processing on the image. The second image processing apparatus includes a second image processing section that performs a predetermined image processing on the image. The image processing control apparatus includes: a performance information acquiring section that acquires performance information including information regarding a time for which each of the first image processing section and the second image processing section performs the predetermined image processing on the image from each of the first image processing apparatus and the second image processing apparatus; a performance comparison section that compares performance information acquired by the performance information acquiring section from each of the first image processing apparatus and the second image processing apparatus with each other; a processing apparatus selecting section that selects which of the first image processing apparatus or the second image processing apparatus performs the predetermined image processing on the image based on the comparison result by the performance comparison section; and a processing control section that causes either the first image processing section of the first image processing apparatus or the second image processing section of the second image processing apparatus selected by the processing apparatus selecting section to perform the predetermined image processing on the image.

Here, all necessary features of the present invention are not listed in the summary of the invention. The sub-combinations of the features may become the invention.

According to the present invention, the optimum image processing apparatus to perform a predetermined image processing on an image can be selected among a plurality of image processing apparatuses, so that the selected image processing apparatus can perform a the predetermined image processing on the image.

DESCRIPTION OF EXEMPLARY EMBODIMENTS

Hereinafter, the present invention will now be described through preferred embodiments. The embodiments do not limit the invention according to claims and all combinations of the features described in the embodiments are not necessarily essential to means for solving the problems of the invention.

Figure 1:
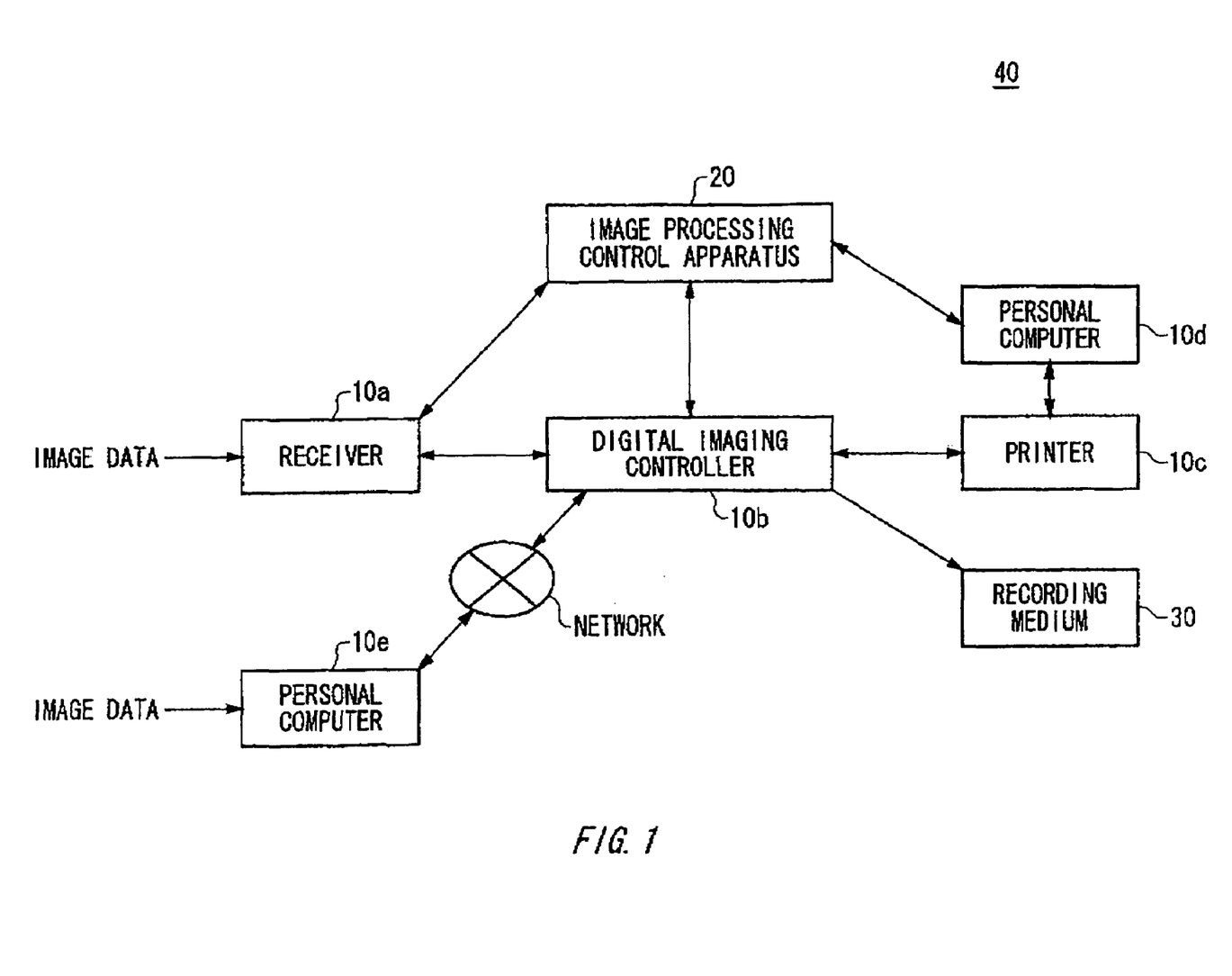
FIG. 1 is a conceptual diagram showing an image processing system 40.

FIG. 1 is a conceptual diagram showing an image processing system 40 according to an embodiment of the present invention. The image processing system 40 includes a receiver 10a, a digital imaging controller 10b, a printer 10c, a personal computer 10d, a personal computer 10e, an image processing control apparatus 20 and a recording medium 30. Here, each of the receiver 10a, the digital imaging controller 10b, the printer 10c, the personal computer 10d and the personal computer 10e is an example of image processing apparatuses 10 according to the present embodiment. The image processing system 40 according to the present embodiment transmits/receives performance information including information regarding a time for which each of the plurality of image processing apparatuses 10 performs an image processing and judges which of the image processing apparatus 10 performs the predetermined image processing on the image for the minimum time. Then, it aims that the image processing apparatus 10 judged as that the time for performing an image processing on the image is minimum will perform the predetermined image processing on the image.

A user inputs image data to the receiver 10a. The user selects whether an image processing will be performed on an image by the receiver 10a or an image processing will be performed on a image by any other image processing apparatus 10 other than the receiver 10a. When the user selects to perform the image processing on the image by the receiver 10a, the image processing may be performed on the image by the receiver 10a regardless of the status of the system resource of the other image processing apparatus 10 other than the receiver 10a included in the image processing system 40. In this case, the receiver 10a records information indicative that the image processing is completed in association with the image after performing the image processing on the image. Then, when the image is transmitted to any image processing apparatus 10 other than the receiver 10a, the image is transmitted with the information indicating that the other image processing apparatus 10 is prohibited from performing the image processing which has been performed by the receiver 10a.

Thereby the user can check the result of the image processing on the image by the receiver 10a and instruct the other image processing apparatus 10 behind the receiver 10a not to perform the image processing which has been performed by the receiver 10a. Therefore, a plurality of image processing apparatuses 10 can be prohibited from performing the same image processing on the same image.

Meanwhile, when the user selects not to perform any image processing on the image by the receiver 10a, the receiver 10a communicates with the digital imaging controller 10b, the printer 10c and the personal computer 10d each other and judges which of the image processing apparatuses 10 can perform the image processing on the image for the minimum time. Then, the receiver 10a transmits the image inputted by the user to the image processing apparatus 10 judged as that the time for the image processing is minimum. In this case, the receiver 10a transmits, in association with the image, information indicating that the image processing apparatus 10 selected by the receiver 10a has to perform the image processing. That is, when any image processing apparatus 10 other than the image processing apparatus 10 selected by the receiver 10a receives the image, the image is transmitted to the image processing apparatus 10 selected by the receiver 10a without performing any image processing on the image. When the image processing apparatus 10 selected by the receiver 10a receives the image inputted by the user, the image processing apparatus selected by the receiver 10a performs the image processing on the image.

Additionally, the image processing control apparatus 20 included in the image processing system 40 may communicate with the receiver 10a, the digital imaging controller 10b, the printer 10c and the personal computer 10d, respectively and judge which of the image processing apparatus 10 can perform the image processing on the image for the minimum time. For example, the image processing apparatus 20 acquires information on the system resource, the load status of the CPU and version information of the installed image processing software for each of the plurality of image processing apparatuses 10. The image processing apparatus 20 judges which of the image processing apparatus 10 can perform the image processing on the image for the minimum time. Then, the image processing control apparatus 20 controls the image processing apparatus 10 judged as that the time for processing the image is minimum to perform the image processing on the image inputted to the receiver 10a by the user. Here, the image processing system 40 may record an image obtained by the image processing is performed on the recording medium 30. Additionally, the image processing system 40 may cause the printer 10c to print the image on which the image processing is applied.

Thereby the image processing system 40 can select the image processing apparatus 10 of which time for processing on the image inputted to the receiver 10a is minimum among the plurality of image processing apparatuses 10 included in the image processing system 40 and causes the selected image processing apparatus 10 to perform the image processing. Therefore, the image processing system 40 can improve the efficiency of the image processing as a whole.

Moreover, the user may input image data to the own personal computer 10e and provide an image to the image processing apparatus 10 such as the digital imaging controller 10b included in the image processing system 40 through the network. In this case, when the user performs a predetermined image processing on an image by using the personal computer 10e, the personal computer 10e records, in association with the image, information indicating that the predetermined image processing has been performed on the image and any other image processing apparatus 10 is prohibited from performing the predetermined image processing on the image. Then, when the other image processing apparatus 10 receives the image inputted to the personal computer 10e by the user through the network, the personal computer 10e may perform on the image any image processing other than the image processing which has been performed on the image. Here, when the user inputs image data to the personal computer 10e but not perform any image processing on the image by using the personal computer 10e, the digital imaging controller 10b which received the image through the network or the image processing control apparatus 20 which monitors the plurality of image processing apparatuses 10 may select the image processing apparatus 10 of which time for processing the image is minimum by the operation as described above. Then, the image processing apparatus 10 selected by the image processing control apparatus 20 can perform a predetermined image processing on the image inputted by the user.

Figure 2:
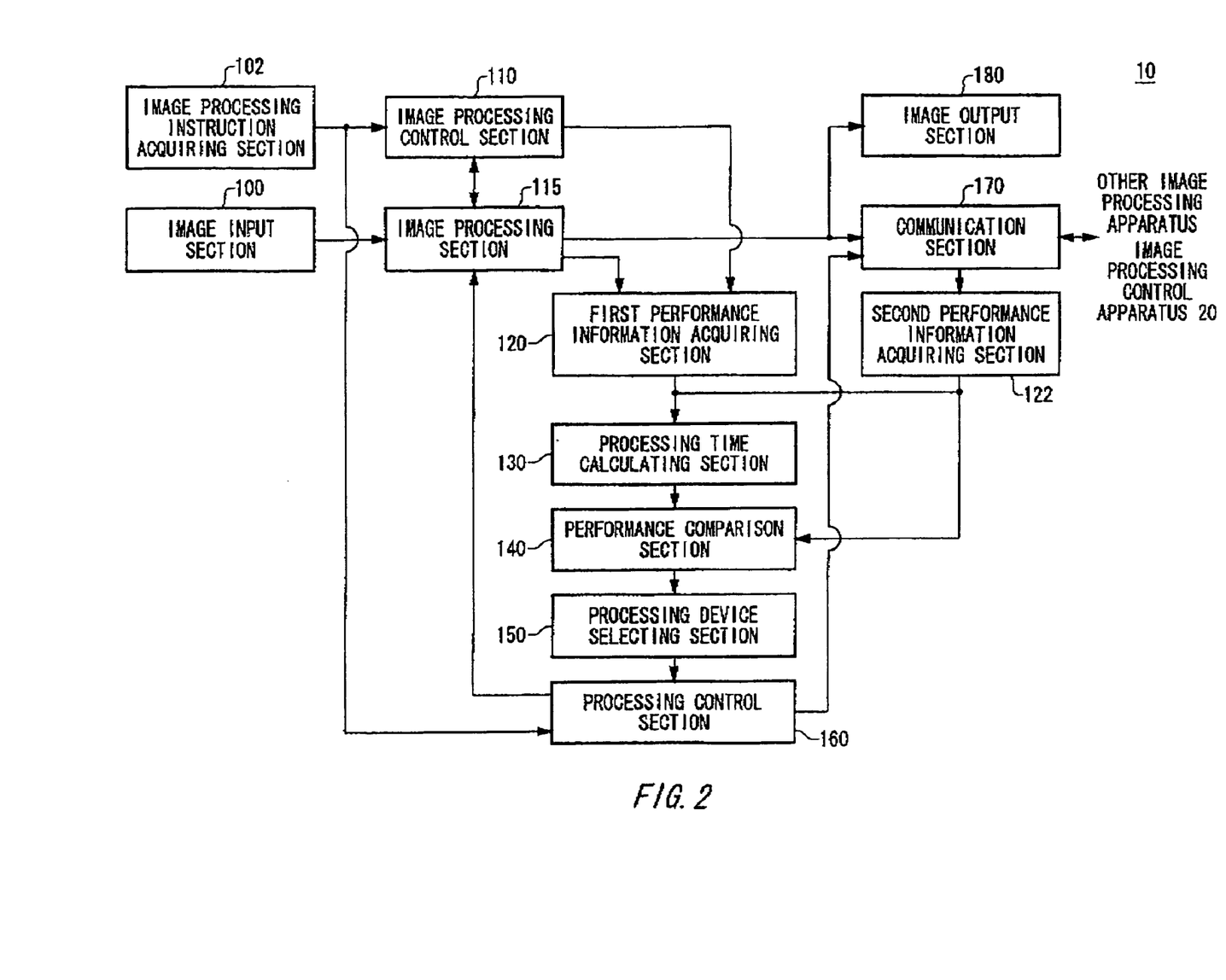
FIG. 2 is a block diagram showing the functional configuration of an image processing apparatus 10.

FIG. 2 shows an example of functional configuration of the image processing apparatus 10 according to the present embodiment. The image processing apparatus includes an image input section 100, an image processing instruction acquiring section 102, an image processing control section 110, an image processing section 115, a first performance information acquiring section 120, a second performance information acquiring section 122, a processing time calculating section 130, a performance comparison section 140, a processing apparatus selecting section 150, a processing control section 160, a communication section 170 and an image output section 180. In the image processing system including the first image processing apparatus and the second image processing apparatus that perform image processing on images according to another embodiment of the present invention, each of the first image processing apparatus and the second image processing apparatus is an example of the image processing apparatus 10 according to the present embodiment. Then, the first image processing apparatus and the second image processing apparatus may include a part of or all of the function and the configuration of each component constituting the image processing apparatus 10 according to the present embodiment. Here, the first image processing apparatus and the second image processing apparatus have approximately the same components each other. For example, each of the first image processing section included in the first image processing apparatus and the second image processing section included in the second image processing apparatus is an example of image processing section 115 of the image processing apparatus 10 according to the present embodiment.

The image input section 100 inputs an image to the image processing apparatus 10. The image input section 100 inputs an image as image data from the outside by reading a photograph and the image printed on a paper medium. Here, a tag may be attached to the image. The tag attached to the image may have information indicative of the size of data of the image, information indicative of the image capturing condition at which the image is captured, information indicating whether a predetermined image processing is performed on the image, image processing apparatus identification information for identifying an appropriate image processing apparatus which performs the predetermined image processing on the image, information indicative of the kind of an appropriate image processing on the image and information indicating that the predetermined image processing is prohibited from being performed on the image. Additionally, the image input section 100 may input image data through a recording medium such as a semiconductor memory and a network such as a LAN and Internet. The image input section 100 provides the input image to the image processing section 115.

The image processing instruction acquiring section 102 acquires an instruction to perform a predetermined image processing on the image in accordance with the manual operation by a user. The image processing instruction acquiring section 102, for example, may acquire an instruction indicating that the user performs the image processing on the image by using the image processing apparatus 10, and an instruction indicating which of an image processing among a plurality of various image processing is performed on the image. Additionally, the image processing instruction acquiring section 102 may cause the user to input an indication of the quality of the image processing and acquire the indication. The image processing instruction acquiring section 102 provides the information indicative of the acquired indication to the image processing control section 110 and the processing control section 160.

The image processing control section 110 causes the image processing section 115 to perform an image processing based on the indication received from the image processing instruction acquiring section 102. Additionally, the image processing control section 110 may analyze information of the tag attached to the image and cause the image processing section 115 to perform the predetermined image processing. For example, when the information on the tag attached to the image includes information indicating that any image processing is prohibited from being performed on the image, the image processing control section 110 does not cause the image processing section 115 to perform the image processing but causes the communication section 170 to transmit to the other image processing apparatus the other image processing apparatus the image inputted from the image input section to the image processing section 115. Additionally, when the information on the tag attached to the image includes image processing apparatus identification information for identifying an appropriate image processing apparatus that performs the image processing on the image, and also when the image processing apparatus indicated by the image processing apparatus identification information is the image processing apparatus 10, the image processing control section 110 causes the image processing section 115 to perform the image processing.

Additionally, when the processing control section 160 provides information indicating that the image processing is performed to the image processing section 115, the image processing control section 110 causes the image processing section 115 to perform the image processing based on the information. Further, the image processing control section 110 provides information regarding version information of the software for the image processing of the image processing apparatus 10 to the first performance information acquiring section 120. Moreover, the image processing control section 110 may cause the image processing apparatus 10 to perform an automatic setup processing based on the instruction received from the image processing instruction acquiring section 102. The image output section 180 outputs the image received from the image processing section 115 or the image on which the image processing is applied. Here, an image display device that displays image data, such as a monitor and a writing device that writes image data on a recording medium such as DVD is an example of image output section 180. Additionally, the image output section 180 is such as a monitor, the image output section 180 transforms the received image data into a visible image to display the same.

The image processing section 115 performs a predetermined image processing on the image received from the image input section 100 based on the control of the image processing control section 110 and the processing control section 160. Additionally, the image processing section 115 may perform a predetermined image processing on the image based on the instruction received from the image processing instruction acquiring section 102. The image processing performed by the image processing section 115 may be at least one of plural kinds of image processing such as changing the light and shade, posterization, solarization, color conversion of a color image, pseudocolorization, changing the hue, the saturation and the lightness of an image, edge extraction, edge enhancement, sharpness correction, spatial filtering, red eye correction processing and gold eye collection processing. Here, the red eye correction processing may include a red eye detection processing and a red eye modification processing. Also the gold eye correction may include a gold eye detection processing and a gold eye modification processing. Additionally, the kind of image processing performed on an image by the image processing section 115 is not limited to the above described image processing and the other image processing may be applied. The image processing section 115 provides the image, the size of data of the image or the image on which the image processing is applied to the communication section 170 and the image output section 180. Additionally, the image processing section 115 may provide the first performance information including information regarding a time for performing a predetermined image processing on the image to the first performance information acquiring section 120. The first performance information may be information on a processing time for performing a predetermined image processing on the image, for example.

The first performance information acquiring section 120 acquires the first performance information on the image processing apparatus 10. The first performance information acquiring section 120 may receive the first performance information from the image processing section 115. Additionally, the first performance information acquiring section 120 may acquire the performance of the hardware of the image processing apparatus 10 image processing apparatus 10 as the first performance information. Specifically, the first performance information acquiring section 230 may acquire the amount of space of the memory, the CPU performance and the version information on the software for the image processing installed on the image processing apparatus 10 as the first performance information. For example, the first performance information acquiring section 120 may acquire the fast hardware resource information indicative of the hardware resource of the image processing apparatus 10 as the first performance information. Here, the hardware resource may include the memory resource, the load status of the CPU and the CPU specification. Moreover, the first performance information acquiring section 120 may acquire the first performance information from the image processing control section 110. Further, the first performance information acquiring section 120 may acquire the first performance information for each of the plural kinds of image processing. For example, the first performance information acquiring section 120 may acquire information regarding a time for which the image processing section 115 performs the red eye correction processing on the image as the first performance information. Then, the first performance information acquiring section 120 may acquire information indicative of the quality of image processing as the first performance information. The first performance information acquiring section 120 provides the acquired first performance information to the processing time calculating section 130 or the performance comparison section 140.

The communication section 170 communicates with the image processing apparatus 10, any image processing apparatus other than the image processing apparatus 10 or the image processing control apparatus 20. The communication section 170 transmits the image received from the image processing section 115, the size of data of the image or the image on which the image processing is applied to the other image processing apparatus or the image processing control apparatus 20. Additionally, the communication section 170 transmits the predetermined information received from the processing control section 160 to the other image processing apparatus or the image processing control apparatus 20. Moreover, the communication section 170 may receive the image, the size of data of the image, the image on which the image processing is applied or a second performance information.

The second performance information acquiring section 122 acquires the second performance information including information regarding a time for which any image processing apparatus other than the image processing apparatus 10 performs a predetermined image processing on the image. If there are plurality of the other image processing apparatuses, the second performance information acquiring section 122 may acquire the second performance information for each of the plurality of image processing apparatuses. Then, the second performance information acquiring section 122 may acquire the second performance information from the other image processing apparatus through the communication section 170. Additionally, the second performance information acquiring section 122 may acquire the second performance information from the image processing apparatus 20. Here, the second performance information acquiring section 122 may acquire the performance of the hardware of the other image processing apparatus the other image processing apparatus as the second performance information. Specifically, the second performance information acquiring section 122 may acquire the amount of space of the memory, the CPU performance and the version information on the software for the image processing installed on the other image processing apparatus as the second performance information. For example, the second performance information acquiring section 122 may acquire the second hardware resource information indicative of the hardware resource of the other image processing apparatus as the second performance information. Additionally, the second performance information acquiring section 122 may acquire the second performance information for each of the plural kinds of image processing. For example, the second performance information acquiring section 122 may acquire information regarding a time for which the other image processing apparatus performs a red eye correction processing on the image as the second performance information. Then, the second performance information acquiring section 122 may acquire information indicative of the quality of the image processing as the second performance information. The second performance information acquiring section 122 provides the acquired second performance information to the processing time calculating section 130 or the performance comparison section 140.

The processing time calculating section 130 calculates a first processing time for which the image processing section 115 performs a predetermined image processing on the image based on the first performance information received from the first performance information acquiring section 120. Additionally, the processing time calculating section 130 calculates a second processing time for which the other image processing apparatus perform the predetermined image processing on the image based on the second performance information acquired by the second performance information acquiring section 122. Specifically, the processing time calculating section 130 may calculate the first processing time and the second processing time based on the size of data of the image received from the image input section 100 by the image processing section 115 and the kind of the image processing received from the image processing instruction acquiring section 102 by the image processing control section 110. For example, each of the image processing apparatus 10 and the other image processing apparatus the other image processing apparatus may previously have a reference processing time being the processing time for performing a predetermined image processing on an image having a predetermined size of data in association with the kind of the predetermined image processing. Then, the processing time calculating section 130 may calculate the first processing time and the second processing time based on the reference processing time previously provided in the image processing apparatus 10 and the other image processing apparatus in association with the kind of the image processing received from the first performance information acquiring section 120 and the second performance information acquiring section 122 and the size of data of the image inputted by the image input section 100. Here, the reference processing time previously provided in the other image processing apparatus in association with the kind of the predetermined image processing may be acquired by the second performance information acquiring section 122 through the communication section 170.

Additionally, the processing time calculating section 130 may calculate for each of the plural kinds of image processing the first processing time for which the image processing section 115 performs the plural kinds of image processing on the image based on plural pieces of first performance information acquired by the first performance information acquiring section 120. Then, the processing time calculating section 130 may calculate for each of the plural kinds of image processing the second processing time for which the other image processing apparatus performs each of the plural kinds of image processing on the image based on each of the plural pieces of second performance information acquired by the second performance information acquiring section 122. The processing time calculating section 130 provides the calculated first processing time and second processing time to the performance comparison section 140.

The performance comparison section 140 compares the first performance information received from the first performance information acquiring section 120 with the second performance information received from the second performance information acquiring section 122. Receiving the first processing time and the second processing time from the processing time calculating section 130, the performance comparison section 140 compares the first processing time with the second processing time which have been received. Additionally, the performance comparison section 140 may compare for each of the plural kinds of image processing the first processing time with the second processing time which are calculated by the processing time calculating section 130. Moreover, the performance comparison section 140 may compare information indicative of the processing quality included in the first performance information received from the first performance information acquiring section 120 with information indicative of the processing quality included in the second performance information received from the second performance information acquiring section 122. Further, the performance comparison section 140 may compare the first hardware resource information included in the first performance information received from the first performance information acquiring section 120 with the second hardware resource information included in the second performance information received from the second performance information acquiring section 122. The performance comparison section 140 provides the comparison result to the processing apparatus selecting section 150.

The processing apparatus selecting section 150 selects which of the image processing apparatus 10 or the other image processing apparatus performs a predetermined image processing on the image based on the comparison result received from the performance comparison section 140. Specifically, the processing apparatus selecting section 150 may select the image processing apparatus of which processing time for performing the image processing on the image is minimum among the image processing apparatus 10 and the other image processing apparatus based on the comparison result by the performance comparison section 140. For example, selecting which of the image processing apparatus 10 or the other image processing apparatus the other image processing apparatus performs a red eye correction processing, the processing apparatus selecting section 150 selects the image processing apparatus of which processing time is minimum based on the comparison result received from the performance comparison section 140. Additionally, the processing apparatus selecting section 150 may select the image processing apparatus of which hardware resource is larger among the image processing apparatus 10 and the other image processing apparatus based on the comparison result received from the performance comparison section 140. Moreover, the processing apparatus selecting section 150 selects which of the image processing apparatus 10 or the other image processing apparatus performs each of the plural kinds of image processing on the image based on the comparison result received from the performance comparison section 140. For example, the processing apparatus selecting section 150 determines that a sharpness correction processing is performed on the image by the image processing apparatus 10 and a gold eye correction is performed on the image by the other image processing apparatus based on the comparison result received from the performance comparison section 140 and selects the image processing apparatus appropriate for performing each image processing. Further, the processing apparatus selecting section 150 may select the image processing apparatus of which processing quality is maximum among the image processing apparatus 10 and the other image processing apparatus based on the comparison result received from the performance comparison section 140. The processing apparatus selecting section 150 provides information for identifying the selected image processing apparatus to the processing control section 160.

The processing control section 160 causes the image processing apparatus indicated by the information for identifying the image processing apparatus received from the processing apparatus selecting section 150 to perform the predetermined image processing. Specifically, the communication section 170 transmits the information indicative of the kind of the image processing received from the image processing instruction acquiring section 102 in association with the image inputted by the image input section 100 to the image processing apparatus selected by the processing apparatus selecting section 150. Then, the processing control section 160 causes the image processing apparatus to perform the predetermined image processing. For example, the processing control section 160 causes the image processing apparatus selected by the processing apparatus selecting section 150 to perform a red eye correction processing on the image. Additionally, when the processing apparatus selecting section 150 selects the image processing apparatus 10, the processing control section 160 controls the image processing section 115 to perform the predetermined image processing.

Moreover, causing the image processing section of the image processing apparatus selected by the processing apparatus selecting section 150 to perform the predetermined image processing on the image, the processing control section 160 records information indicating that any other image processing apparatus is prohibited from performing the predetermined image processing in association with the image. Further, when the image processing section 115 performs an image processing on the image in accordance with the manual operation by the user, the processing control section 160 may record information indicating that any other image processing apparatus is prohibited from performing the predetermined image processing in association with the image.

The image processing apparatuses 10 according to the present embodiment can compare the processing performance for each of the plurality of image processing apparatuses with each other when a predetermined image processing is performed on the image, so that the image processing apparatus of which time for performing the predetermined image processing is minimum can be automatically selected. Thereby the user can automatically perform the image processing on the image by using the image processing apparatus of which time for performing the image processing is minimum only by inputting image data to the image processing apparatus 10 to indicate the kind of the desired image processing.

Additionally, the image processing apparatus 10 according to the present embodiment can record the image on which the predetermined image processing has been already applied in association with information indicating that the predetermined image processing is prohibited from being performed. Thereby even if the image on which the predetermined image processing has been applied is transmitted to the different image processing apparatus, the image processing which has been applied on the image is prohibited from being performed again by the different image processing apparatus.

Further, the image processing apparatus 11 according to the present embodiment can automatically select the image processing apparatus being capable of performing the predetermined image processing for the minimum time and record the image on which the predetermined image processing has been already applied in association with information indicating that the predetermined image processing is prohibited from being performed. Thereby when plural kinds of image processing are performed on the image, the image processing which has been already applied on the image is prohibited from being performed again and can allocate the image processing apparatus of which processing time is minimum for each of the plural kinds of image processing. Therefore, the image processing system 40 can improve the efficiency of the image processing as a whole.

Figure 3:
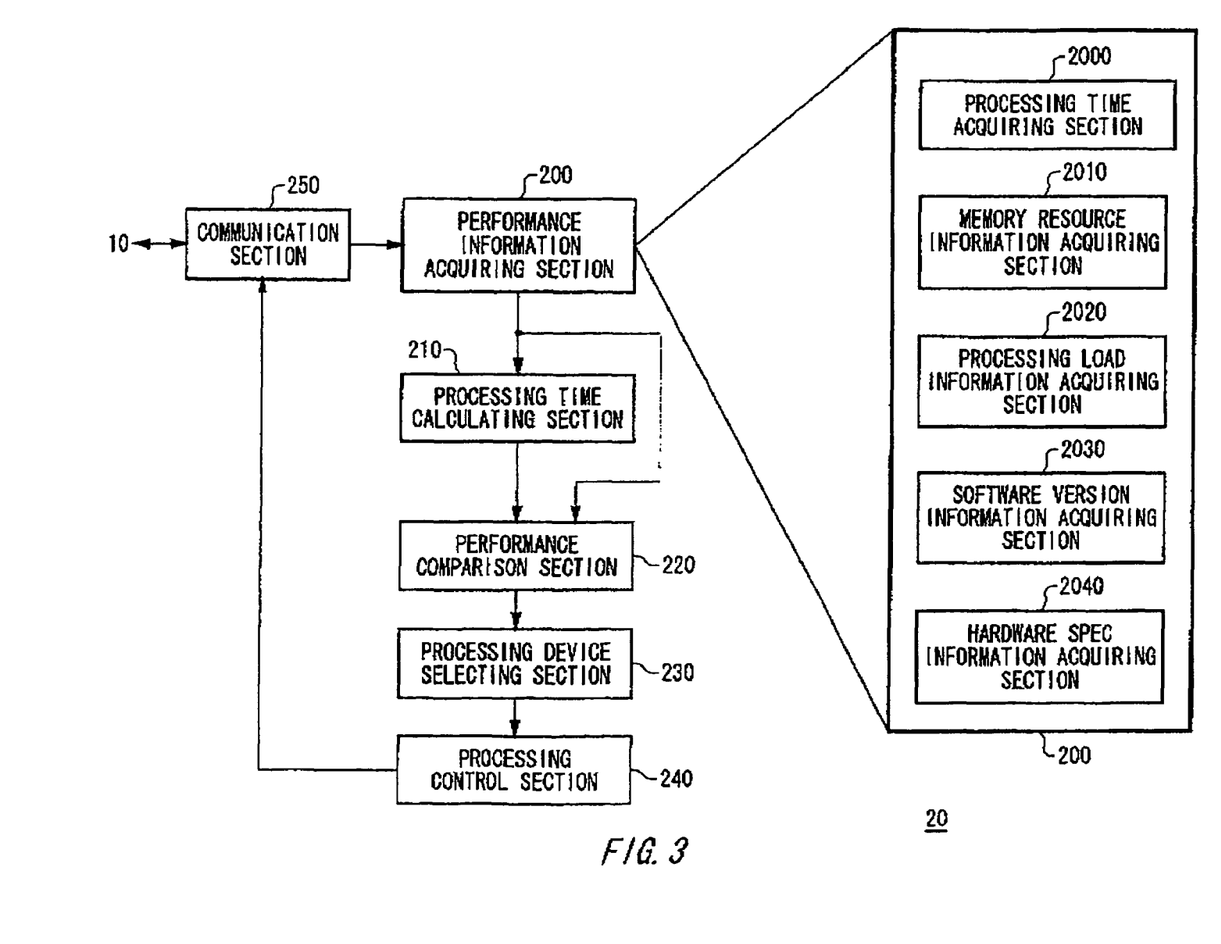
FIG. 3 is a block diagram showing the functional configuration of the image processing control apparatus 20.

FIG. 3 shows an example of functional configuration of the image processing control apparatus 20 according to the present embodiment. The image processing control apparatus 20 includes a performance information acquiring section 200, a processing time calculating section 210, a performance comparison section 220, a processing apparatus selecting section 230, a processing control section 240 and a communication section 250. Additionally, the performance information acquiring section 200 includes a processing time acquiring section 2000, a memory resource information acquiring section 2010, a processing load information acquiring section 2020, a software version information acquiring section 2030 and a hardware spec information acquiring section 2040. The performance information acquiring section 200, the processing time calculating section 210, the performance comparison section 220, the processing apparatus selecting section 230, the processing control section 240 and the communication section 250 included in the image processing control apparatus 20 according to the present embodiment have the substantially the same functions of those of the performance information acquiring section 120, the processing time calculating section 130, the performance comparison section 140, the processing apparatus selecting section 150, the processing control section 160 and the communication section 170 included in the image processing apparatus 10 described with reference to FIG. 2, so that the detailed description is omitted.

The performance information acquiring section 200 acquires performance information including information regarding a time for each of the plurality of image processing apparatuses 10 performs a predetermined image processing on an image from each of the plurality of image processing apparatuses 10 through the communication section 250. Specifically, the performance information acquiring section 200 acquires the performance information including information regarding the time for performing the predetermined image processing on the image from each of the first image processing section included in the first image processing apparatus and the second image processing section included in the second image processing apparatus. More specifically, the performance information acquiring section 200 may include the processing time acquiring section 2000, the memory resource information acquiring section 2010, the processing load information acquiring section 2020, the software version information acquiring section 2030 and the hardware spec information acquiring section 2040. The processing time acquiring section 2000 acquires for each of the plurality of image processing apparatuses 10 information indicating a processing time for which each of the plurality of image processing apparatuses 10 performs the predetermined image processing on the image through the communication section 250. The memory resource information acquiring section 2010 acquires memory resource information indicative of the memory resource for each of the plurality of image processing apparatuses 10 from each of the plurality of image processing apparatuses 10 through the communication section 250.

The processing load information acquiring section 2020 acquires processing load information indicative of the processing, load for each of the plurality of image processing apparatuses 10 from each of the plurality of image processing apparatuses 10 through the communication section 250. The processing load information may be the status of using the CPU of the image processing apparatus 10. Then, the software version information acquiring section 2030 acquires information on the version of the image processing software installed on each of the plurality of image processing apparatuses 10 and information regarding the operating system from each of the plurality of image processing apparatuses 10 through the communication section 250. The hardware spec information acquiring section 2040 acquires hardware spec information indicative of the hardware spec for each of the plurality of image processing apparatuses 10 from each of the plurality of image processing apparatuses 10 through the communication section 250. The hardware spec information may be information regarding the hardware resource, the clock number of the CPU, the cash memory and the chip set. Here, the hardware resource may include the load status of the CPU and the CPU spec and so forth. The performance information acquiring section 200 provides the acquired performance information to the processing time calculating section 210 or the performance comparison section 220.

The processing time calculating section 210 calculates for each of the plurality of image processing apparatuses a processing time for which the image processing apparatus performs the predetermined image processing on the image based on the performance information acquired by the performance information acquiring section 200. The performance comparison section 220 compares the performance information on the plurality of image processing apparatuses acquired by the performance information acquiring section 200 with each other. The performance comparison section 220 provides the comparison result to the processing apparatus selecting section 230. The processing apparatus selecting section 230 selects which of the plurality of image processing apparatuses 10 performs the predetermined image processing on the image based on the comparison result by the performance comparison section 220. The processing apparatus selecting section 230 provides information for identifying the selected image processing apparatus to the processing control section 240. The processing control section 240 causes the image processing apparatus indicated by the information for identifying the image processing apparatus received from the processing apparatus selecting section 230 to perform the predetermined image processing on the image.

The image processing control apparatus 20 according to the present embodiment can monitor a plurality of image processing apparatuses and automatically select the image processing apparatus optimally appropriate for performing the image processing on the image based on the performance information for each of the image processing apparatuses acquired from each of the plurality of image processing apparatuses. Thereby the image processing system 40 can significantly improve the efficiency of the image processing as a whole.

Figure 4:
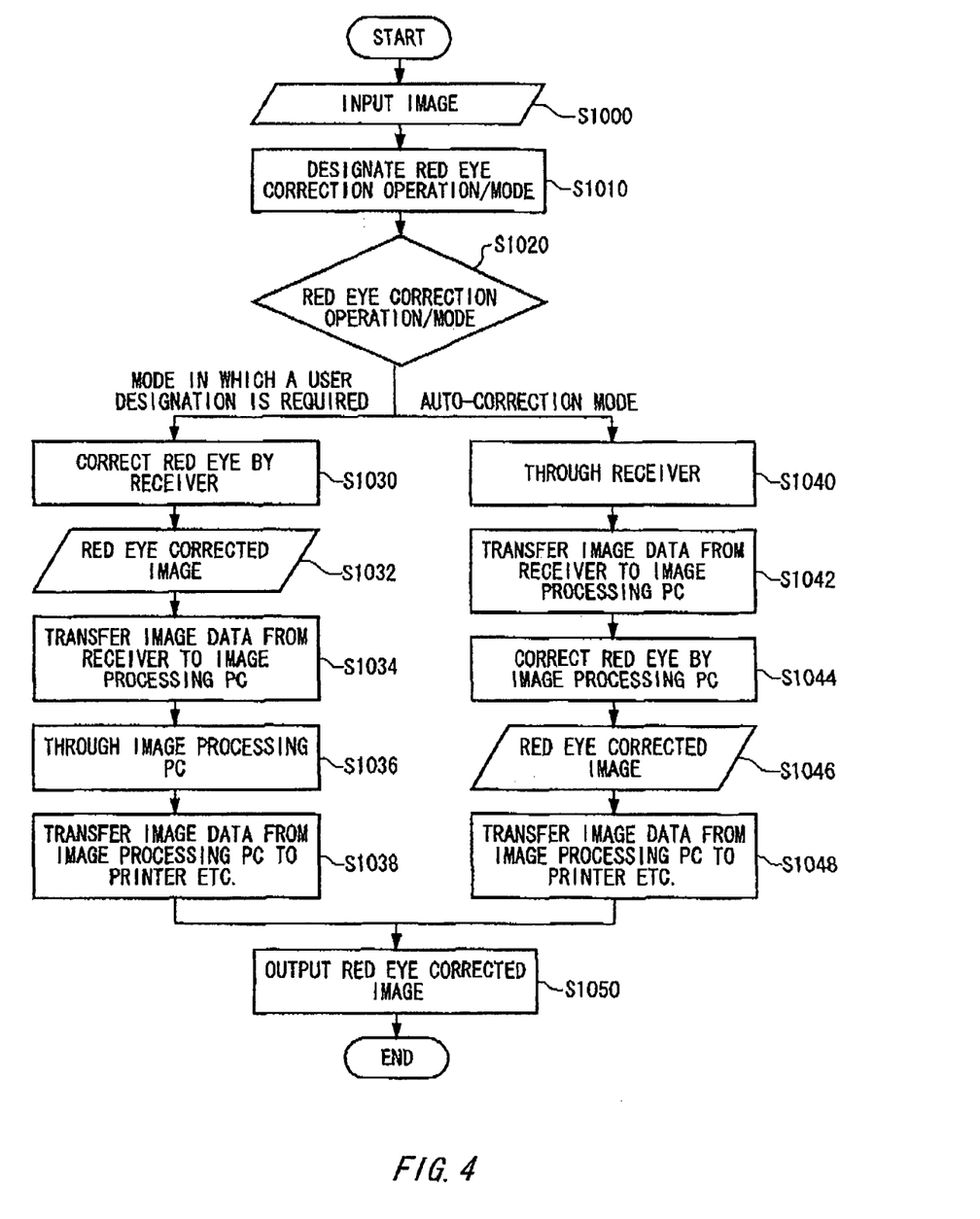
FIG. 4 is a flowchart showing a processing of an image processing system 40.

FIG. 4 shows an example of processing flow of the image processing system 40 according to the present embodiment. Firstly, the image input section 100 included in the receiver 10a inputs an image (S1000). Then, the image processing instruction acquiring section 102 acquires information indicating whether the receiver 10a performs a red eye correction processing on the image (S1010). Here, a red eye correction processing operation/mode designation is an example of selecting method for the case that the user selects whether the red eye correction processing is performed on the image by the receiver 10a. When the user selects that the red eye correction processing is performed by the receiver 10a (S1020: a mode in which a user designation is required), the image processing section 115 included in the receiver 10a performs a predetermined image processing such as a red eye correction processing on the image inputted by the image input section 100 (S1030). The image processing section 115 outputs a red eye corrected image which is an image on which the red eye correction processing has been applied to the image output section 180 (S1032).

Additionally, the image processing section 115 records the red eye corrected image in association with information indicating that any other processing apparatus is prohibited from performing the red eye correction processing. The image processing section 115 transfers the red eye corrected image from the communication section 170 to the other image processing apparatus such as a personal computer for an image processing (image processing PC) (S1034). Receiving the red eye corrected image, the image processing PC does not perform the red eye correction processing on the red eye corrected image (S1036) but further transfers the image data to the other image processing apparatus such as a printer (S1038). Then, the printer which received the red eye corrected image outputs the red eye corrected image (S1050).

Meanwhile, when the user selects that the red eye correction processing is not performed by the receiver 10a (S1020: auto-correction mode), the receiver 10a transmits the image data to the other image processing apparatus without performing the red eye correction processing on the image inputted by the image input section 100 (S1040). That is, the receiver 10a transfers the image data to the image processing PC being the other image processing apparatus (S1042). Receiving the image data, the image processing PC performs the red eye correction processing on the image (S1044) and acquires a red eye corrected image (S1046). The image processing PC transfers the red eye corrected image to such as a printer (S1048). Then, receiving the red eye corrected image, the printer outputs the red eye corrected image (S1050).

Figure 5:
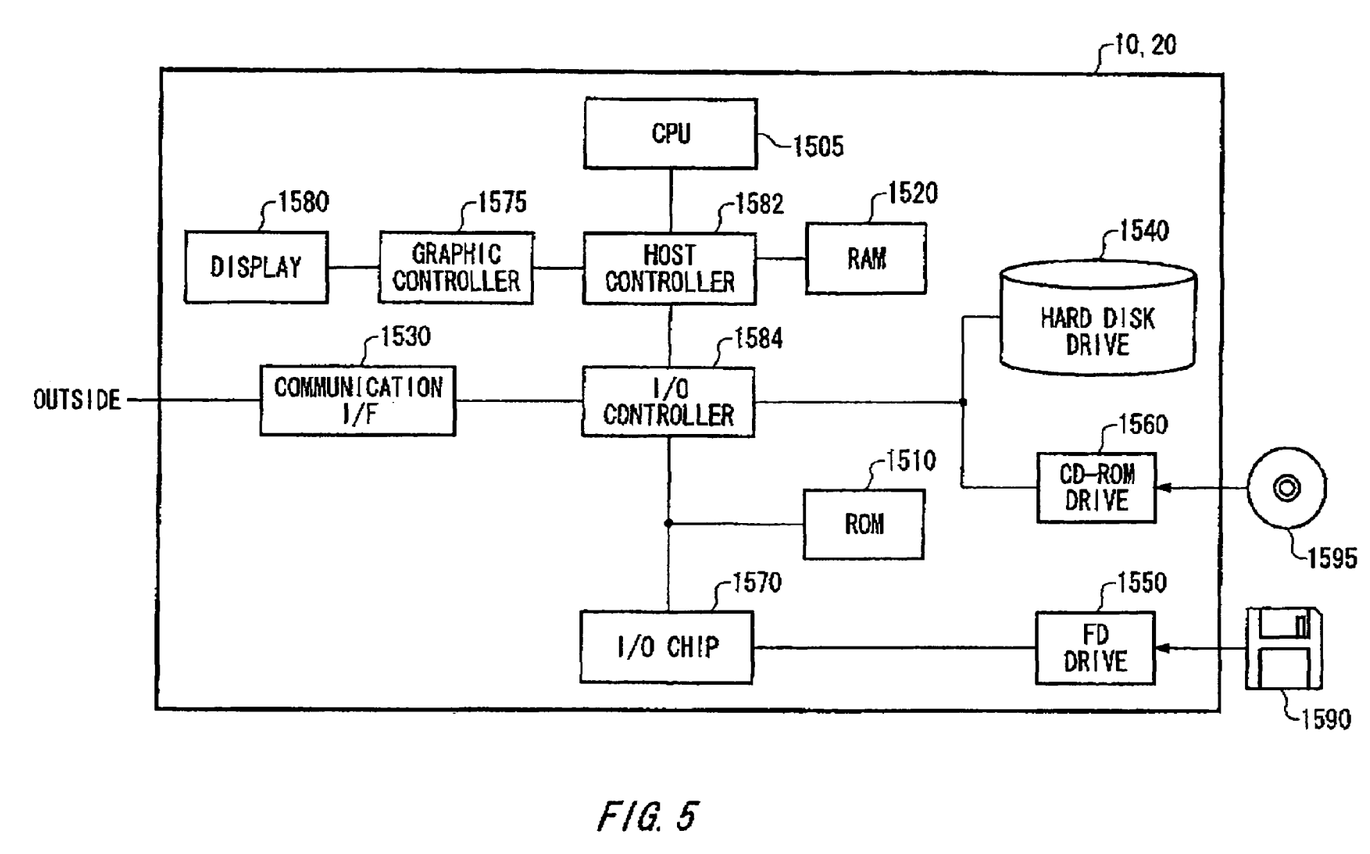
FIG. 5 is a block diagram showing a hardware configuration of the image processing apparatus 10 and the image processing control apparatus 20.

FIG. 5 shows an example of hardware configuration of the image processing apparatus 10 and the image processing control apparatus 20 according to the present embodiment. Each of the image processing apparatus 10 and the image processing control apparatus 20 according to the present embodiment includes a CPU periphery having a CPU 1505, a RAM 1520, a graphic controller 1575 and a display 1580 which are connected through a host controller 1582 each other, an input/output unit having a communication interface 1530, a hard disk drive 1540 and a CD-ROM drive 1560 which are connected to the host controller 1582 through an input/output controller 1584 and a legacy input/output unit having a ROM 1510, a flexible disk drive 1550 and an input/output chip 1570 which are connected to the input/output controller 1584.

The host controller 1582 connects the RAM 1520 to the CPU 1505 and the graphic controller 1575 which access the RAM 1520 with a high transfer ratio. The CPU 1505 operates according to the programs stored in the ROM 1510 and the RAM 1520 to control each unit. The graphic controller 1575 obtains image data generated on a frame buffer provided in the RAM 1520 by the CPU 1505 and displays the same on the display 1580. Alternatively, the graphic controller 1575 may include therein a frame buffer for storing image data generated by the CPU 1505.

The input/output controller 1584 connects the host controller 1582 to the hard disk drive 1540, the communication interface 1530 and the CD-ROM drive 1560 which are relatively high-speed input/output units. The communication interface 1530 communicates with the other units through the network. The hard disk drive 1540 stores the program and data used by the CPU 1505 in each of the image processing apparatus 10 and the image processing control apparatus 20. The CD-ROM drive 1560 reads the program or data from the CD-ROM 1595 and provides the same to the hard disk drive 1540 through the RAM 1520.

The ROM 1510, and the flexible disk drive 1550 and input/output chip 1570 which are relatively low-speed input/output units are connected to the input/output controller 1584. The ROM 1510 stores a boot program executed by the image processing control apparatus 20 at activating and a program depending on the hardware of the image processing apparatus 10 and the image processing control apparatus 20. The flexible disk drive 1550 reads the program or data from a flexible disk 1590 and provides the same to the hard disk drive 1540 through the RAM 1520. The input/output chip 1570 connects various input/output units through the flexible disk drive 1550 and such as a parallel port, a serial port, a keyboard port and a mouse port.

The image processing program and the image processing control program provided to the hard disk drive 1540 through the RAM 1520 are stored in a recording medium, such as the flexible disk 1590, the CD-ROM 1595, or an IC card and provided by the user. The image processing program and the image processing control program are read from the recording medium, installed on the hard disk drive 1540 for each of the image processing apparatus 10 and the image processing control apparatus 20 and executed by the CPU 1505. The image processing program and the image processing control program installed on the image processing apparatus 10 and the image processing control apparatus 20 operate the CPU 1505 to cause the image processing apparatus 10 and the image processing control apparatus 20 to function as: the image input section 100, the image processing instruction acquiring section 102, the image processing control section 110, the image processing section 115, the first performance information acquiring section 120, the second performance information acquiring section 122, the processing time calculating section 130, the performance comparison section 140, the processing apparatus selecting section 150, the processing control section 160, the communication section 170, the image output section 180, the performance information acquiring section 200, the processing time calculating section 210, the performance comparison section 220, the processing apparatus selecting section 230, the processing control section 240, the communication section 250, the processing time acquiring section 2000, the memory resource information acquiring section 2010, the processing load information acquiring section 2020, the software version information acquiring section 2030 and the hardware spec information acquiring section 2040 which are described with reference to FIG. 1-FIG. 4

While the present invention has been described with the embodiment, the technical scope of the invention not limited to the above described embodiment. It is apparent to persons skilled in the art that various alternations and improvements can be added to the above-described embodiment. It is apparent from the scope of the claims that the embodiment added such alternation or improvements can be included in the technical scope of the invention.

What is claimed is:

1. An image processing apparatus that performs an image processing on an image, comprising:
    an image processing section that performs plural kinds of predetermined image processings on the image;
    a first performance information acquiring section that acquires a first performance information including information regarding a time for which the image processing section performs each of the plural kinds of predetermined image processings on the image;
    a second performance information acquiring section that acquires a second performance information including information regarding a time for which any image processing apparatus other than the image processing apparatus performs each of the plural kinds of predetermined image processings on the image;
    a processing time calculating section that calculates a first processing time for which the image processing section performs each of the plural kinds of predetermined image processings on the image based on the first performance information acquired by the first performance information acquiring section and calculates a second processing time which the other image processing apparatus performs each of the plural kinds of predetermined image processings on the image based on the second performance information acquired by the second performance information acquiring section,
    a performance comparison section that compares for each of the plural kinds of predetermined image processings the first processing time with the second processing time which are calculated by the image processing time calculating section,
    a processing apparatus selecting section that selects which of the image processing section of the image processing apparatus or the other image processing apparatus performs each of the plural kinds of predetermined image processings on the image based on the comparison result by the performance comparison section;
    a processing control section that causes either the image processing apparatus or the other image processing apparatus which is selected by the image processing apparatus selecting section to perform each of the plural kinds of predetermined image processings on the image; and
    wherein when the image processing section of the image processing apparatus selected by the processing apparatus selecting section performs one of the plural kinds of predetermined image processings on the image, the processing control section records information indicating that the other image processing apparatus is prohibited from performing the one of the plural kinds of predetermined image processing in association with the image, and
    wherein the processing apparatus selecting section selects an image processing apparatus of which processing time is shorter among the image processing apparatus and the other image processing apparatus based on the comparison result by the performance comparison section.

2. The image processing apparatus as set forth in claim 1 further comprising an image processing instruction acquiring section that acquires an instruction to perform the plural kinds of predetermined image processings on the image according to a manual operation of a user,
    the image processing section performs one of the plural kinds of predetermined image processings on the image based on the instruction acquired by the image processing instruction acquiring section, and
    the processing control section records information, indicating that the other image processing apparatus is prohibited from performing the one of the plural kinds of predetermined image processing when the image processing apparatus performs the image processing on the image according to the manual operation of the user.

3. The image processing apparatus as set forth in claim 1, wherein the image processing section performs a red eye correction processing on the image,
    the first performance information acquiring section acquires the first performance information including information regarding a time for which the image processing section performs the red eye correction processing on the image,
    the second performance information acquiring section acquires the second performance information including information regarding a time for which the image processing apparatus other than the image processing apparatus performs the red eye correction processing on the image,
    the processing apparatus selecting section selects which of the image processing section of the image processing apparatus or the other image processing apparatus performs the red eye connection processing on the image, and
    the processing control section causes either the image processing apparatus or the other image processing apparatus selected by the processing apparatus selecting section to perform the red eye correction processing on the image.

4. The image processing apparatus as set forth in claim 1, wherein the first performance information acquiring section acquires first hardware resource information indicative of the hardware resource of the image processing apparatus as the first performance information, the second performance information acquiring section acquires second hardware resource information indicative of the hardware resource of the image processing apparatus as the second performance information, the performance comparison section compares the first hardware resource information with the second hardware resource information, and the processing apparatus selecting section selects an image processing apparatus of which hardware resource is larger among the image processing apparatus and the other image processing apparatus based on the comparison result by the performance comparison section.

5. An image processing method for performing plural kinds of predetermined image processings on an image, comprising:

acquiring a first performance information on an image processing apparatus including information regarding a time for which the image processing apparatus performs each of the plural kinds of predetermined image processings on the image;

acquiring a second performance information including information regarding a time for which any image processing apparatus other than the image processing apparatus performs each of the plural kinds of predetermined image processings on the image;

calculating a first processing time for which the image processing apparatus performs each of the plural kinds of predetermined image processings on the image based on the acquired first performance information, calculating a second processing time for which the other image processing apparatus performs each of the plural kinds of predetermined image processings on the image based on the second acquired performance information;

comparing for each of the plural kinds of predetermined images processings the first processing time with the second processing time;

selecting which of the image processing apparatus or the other image processing apparatus performs each of the plural kinds of predetermined image processings on the image based on the comparison result in the processing time comparing step; and controlling to cause either the image, processing apparatus or the other image processing apparatus selected in the processing apparatus selecting step to perform each of the plural kinds of predetermined image processings on the image; and recording information when performing ne the plural kinds of predetermined image processings on the image, indicating that the processing apparatus or the other processing apparatus not selected to perform the one of the plural kinds of predetermined image processings is prohibited from performing the one of the plural kinds of predetermined image processings in association with the image.

6. A non-transitory computer readable medium having embodied thereon an image processing program for an image processing apparatus that performs plural kinds of predetermined image processings on an image, the image processing program causes the image processing apparatus to function as:

an image processing section that performs the plural kinds of predetermined image processings on the image;

a first performance information acquiring section that acquires a first performance information including information regarding a time for which the image processing section performs each of the plural kinds of predetermined image processings on the image;

a second performance information acquiring section that acquires a second performance information including information regarding a time for which any image processing apparatus other than the image processing apparatus performs each of the plural kinds of predetermined image processings on the image;

a processing time calculating section that calculates a first processing time for which the image processing section performs each of the plural kinds of predetermined image processings on the image based on the first performance information acquired by the first performance information acquiring section and calculates a second processing time which the other image processing apparatus performs each of the plural kinds of predetermined image processings on the image based on the second performance information acquired by the second performance information acquiring section, a performance comparison section that compares for each of the plural kinds of predetermined image processings the first processing time with the second processing time which are calculated by the image processing time calculating section;

a processing apparatus selecting section that selects which of the image processing section of the image processing apparatus or the other image processing apparatus performs each of the plural kinds of predetermined image processings on the image based on the comparison result by the performance comparison section;

a processing control section that causes either the image processing apparatus or the other image processing apparatus which is selected by the image processing apparatus selecting section to perform each of the plural kinds of predetermined image processings on the image; and wherein when the image processing section of the image processing apparatus or the other image processing apparatus selected by the processing apparatus selecting section performs one of the plural kinds of predetermined image processings on the image, the processing control section records information indicating that the image processing apparatus or the other image processing apparatus not selected to perform the one of the plural kinds of predetermined image processings is prohibited from performing the one of the plural kinds of predetermined image processings in association with the image, and wherein the processing apparatus selecting section selects an image processing apparatus of which processing time is shorter among the image processing apparatus and the other image processing apparatus based on the comparison result by the performance comparison section.

7. An image processing system comprising a first image processing apparatus and a second image processing apparatus that perform image processing on images, wherein the first image processing apparatus includes a first image processing section that performs plural kinds of predetermined image processings on the image, the second image processing apparatus including:

a second image processing section that performs the plural kinds of predetermined image processings on the image;

a first performance information acquiring section that acquires first performance information including information regarding a time for which the first image processing section performs each of the plural kinds of predetermined image processings on the image from the first image processing apparatus, a second performance information acquiring section that acquires second performance information including information regarding a time for which the second image processing section performs each of the plural kinds of predetermined image processings on the image, a processing time calculating section that calculates a first processing time for which the first image processing section performs each of the plural kinds of predetermined image processings on the image based on the first performance information acquired by the first performance information acquiring section and calculates a second processing time which the second image processing apparatus performs each of the plural kinds of predetermined image processings on the image based on the second performance information acquired by the second performance information acquiring section, a performance comparison section that compares for each of the plural kinds of predetermined image processings the first processing time with the second processing time which are calculated by the image processing time calculating section, a processing apparatus selecting section that selects which of the first image processing section of the first image processing apparatus or the second image processing section of the second image processing apparatus performs each of the plural kinds of predetermined image processings on the image based on the comparison result by the performance comparison section, a processing control section that causes either the first image processing section of the first image processing apparatus or the second image processing section of the second image processing apparatus which is selected by the processing apparatus selecting section to perform one of the plural kinds of predetermined image processings on the image; and wherein when the first image processing section of the first image processing apparatus or the second image processing section of the second image processing apparatus selected by the processing apparatus selecting section performs one of the plural kinds of predetermined image processings on the image, the processing control section records information indicating that the first image processing apparatus or the second image processing apparatus not selected to perform the one of the predetermined image processings is prohibited from performing the one of the plural kinds of predetermined image processings in association with the image wherein the processing apparatus selecting section selects an image processing apparatus of which processing time is shorter among the first image processing apparatus and the second image processing apparatus based on the comparison result by the performance comparison section.

8. An image processing control apparatus that controls a plurality of image processing apparatuses which perform image processing on images, comprising:

a performance information acquiring section that acquires performance information including information regarding a time for which each of the plurality of image processing apparatuses performs plural kinds of predetermined image processings on the image from each of the plurality of image processing apparatuses;

a processing time calculating section that calculates processing time for each of the plurality of image processing apparatuses performs each of the plural kinds of predetermined image processings on the image based on the performance information acquired by the performance information acquiring section, a performance comparison section that compares the processing times for each of the plurality of the image processing apparatuses;

a processing apparatus selecting section that selects which of the plurality of image processing apparatuses performs each of the plural kinds of predetermined image processings on the image based on the comparison result by the performance comparison section;

a processing control section that causes the image processing apparatus selected by the processing apparatus selecting section to perform one of the plural kinds of predetermined image processings on the image; and wherein when the image processing apparatus selected by the processing apparatus selecting section performs one of the plural kinds of predetermined image processings on the image, the processing control section records information indicating that the other image processing apparatuses of the plurality of image processing apparatuses are prohibited from performing the one of the plural kinds of predetermined image processings in association with the image, and wherein the processing apparatus selecting section selects which of the plurality of image processing apparatuses of which processing time is shorter among the plurality of processing apparatuses.

9. An image processing system comprising a first image processing apparatus that performs an image processing on an image, a second image processing apparatus that performs an image processing on an image and an image processing control apparatus that controls the first image processing apparatus and the second image processing apparatus, wherein the first image processing apparatus includes a first image processing section that performs plural kinds of predetermined image processings on the image, the second image processing apparatus includes a second image processing section that performs the plural kinds of predetermined image processings on the image, the image processing control apparatus including:

a performance information acquiring section that acquires performance information including information regarding a time for which each of the first image processing section and the second image processing section performs each of the plural kinds of predetermined image processings on the image from each of the first image processing apparatus and the second image processing apparatus;

a processing time calculating section that calculates a first processing time for which the first image processing section performs each of the plural kinds of predetermined image processing on the image based on the performance information acquired by the performance information acquiring section and calculates a second processing time which the second image processing apparatus performs each of the plural kinds of predetermined image processings on the image based on the performance information acquired by the performance information acquiring section, a performance comparison section that compares for each of the plural kinds of predetermined image processings the first processing time with the second processing time which are calculated by the image processing time calculating section;

a processing apparatus selecting section that selects which of the first image processing apparatus or the second image processing apparatus performs each of the plural kinds of predetermined image processings on the image based on the comparison result by the performance comparison section;

a processing control section that causes either the first image processing section of the first image processing apparatus or the second image processing section of the second image processing apparatus selected by the processing apparatus selecting section to perform each of the plural kinds of predetermined image processings on the image; and wherein when the first image processing section of the first image processing apparatus or the second image processing section of the second image processing apparatus selected by the processing apparatus selecting section performs one of the plural kinds of predetermined image processings on the image, the processing control section records information indicating that the other of the first image processing apparatus or second image processing apparatus is prohibited from performing the one of the plural kinds of predetermined image processings in association with the image, and wherein the processing apparatus selecting section selects an image processing apparatus of which processing time is shorter among the first image processing apparatus and the second image processing apparatus based on the comparison result by the performance comparison section.

* * * * *